United States Patent
Lada et al.

(10) Patent No.: US 7,269,746 B1
(45) Date of Patent: Sep. 11, 2007

(54) METHOD OF TRANSMITTING IDENTIFICATION DATA FROM AN OPTION PACK TO A MAIN UNIT BEFORE THE OPTION PACK IS FULLY POWERED

(75) Inventors: Henry F. Lada, Cypress, TX (US); Joseph A. Lightfoot, Cypress, TX (US)

(73) Assignee: Hewlett-Packard Development Company L.P., Houston, TX (US)

( * ) Notice: Subject to any disclaimer, the term of this patent is extended or adjusted under 35 U.S.C. 154(b) by 571 days.

(21) Appl. No.: 09/722,889

(22) Filed: Nov. 27, 2000

(51) Int. Cl.
*G06F 1/26* (2006.01)

(52) U.S. Cl. .......................... 713/300; 713/1

(58) Field of Classification Search ............... 713/1, 713/2, 100, 340; 710/8, 301; 717/11
See application file for complete search history.

(56) References Cited

U.S. PATENT DOCUMENTS

| | | | |
|---|---|---|---|
| 5,845,142 A * | 12/1998 | Hayasaka ................ 713/340 |
| 6,052,742 A * | 4/2000 | Kirinaka et al. ............ 710/10 |
| 6,173,408 B1 * | 1/2001 | Jimbo et al. ............... 713/322 |
| 6,201,771 B1 * | 3/2001 | Otsuka et al. ........... 369/30.32 |
| 6,266,711 B1 * | 7/2001 | Ishikawa et al. ............. 710/8 |
| 6,353,870 B1 * | 3/2002 | Mills et al. ................ 710/301 |
| 6,405,362 B1 * | 6/2002 | Shih et al. ................. 717/174 |
| 6,557,033 B2 * | 4/2003 | Maeda ....................... 709/223 |
| 6,582,311 B1 * | 6/2003 | Sugimura ................... 463/43 |
| 6,609,072 B1 * | 8/2003 | Yamagata ................... 702/64 |

FOREIGN PATENT DOCUMENTS

EP  1001348 A2 *  5/2000

OTHER PUBLICATIONS

"Separate Vibration Unit Extension Mechanism" Research Disclosure, Jun. 1, 1998, UK.*
MMCA Technical Committee, "The MultiMediaCard System Summary", Jan. 1999, MultiMediaCard Association, Version 2.0.*

* cited by examiner

*Primary Examiner*—Rehana Perveen
*Assistant Examiner*—Paul Yanchus, III

(57) ABSTRACT

A Personal Digital Assistant (PDA) or handheld device comprising a main unit and an option pack, wherein the option pack stores all of the application software and drivers. Upon insertion, the hardware interface invokes a device manager on the main unit that interrogates a memory device on the option pack. The interrogation includes data on drivers, applications, configuration and miscellaneous requirements of the option pack. This identification process allows the option pack to store information, drivers and applications on the option pack, so the main unit does not have to use its memory to store information on a large number of option packs. Once the option pack and its applications are identified, the device manager on the main unit retrieves the applications and drivers from a separate memory device on the option pack and downloads the applications and drivers onto the main unit. Upon de-installation of the option pack from the main unit, the applications and drivers are removed from the main unit.

23 Claims, 7 Drawing Sheets

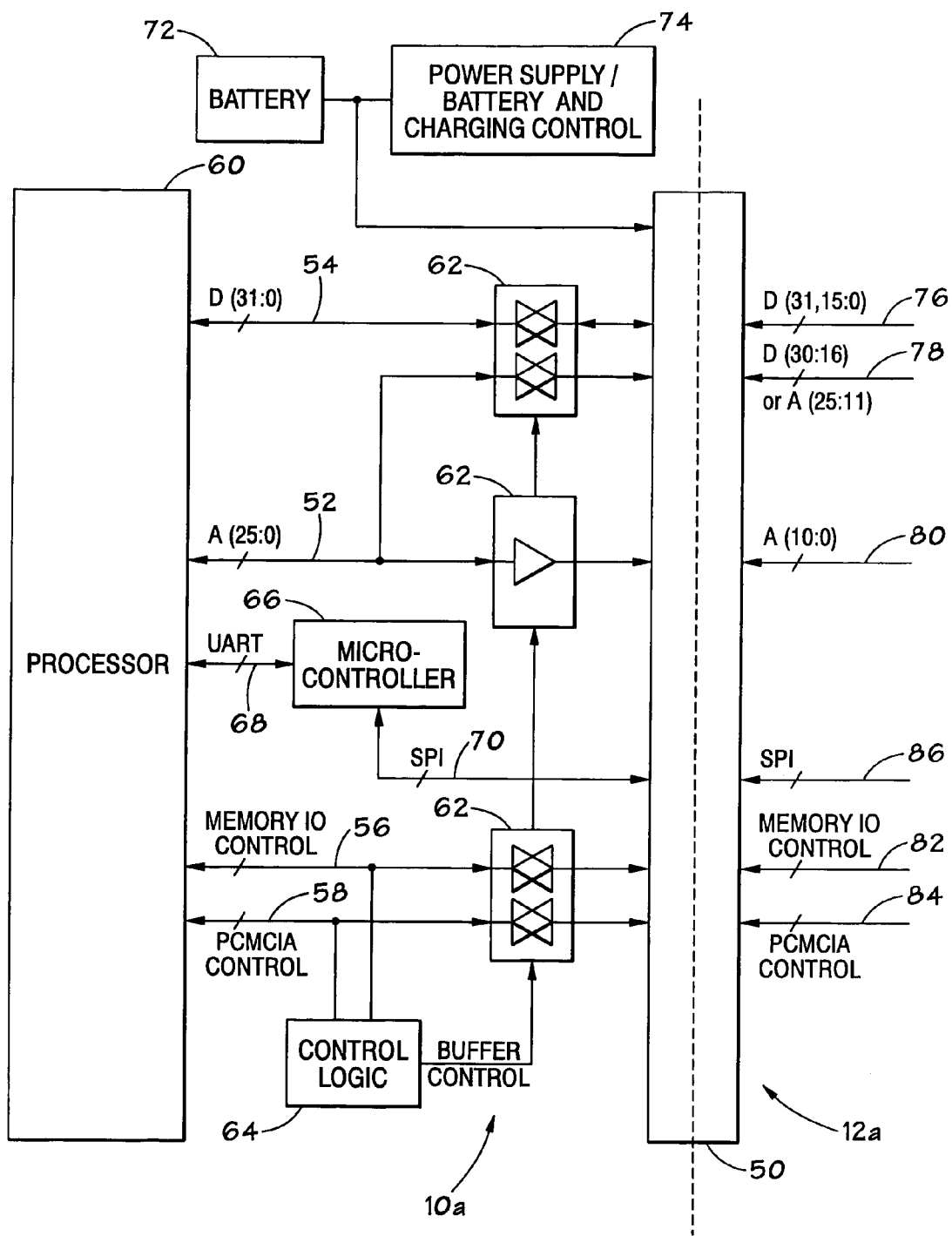

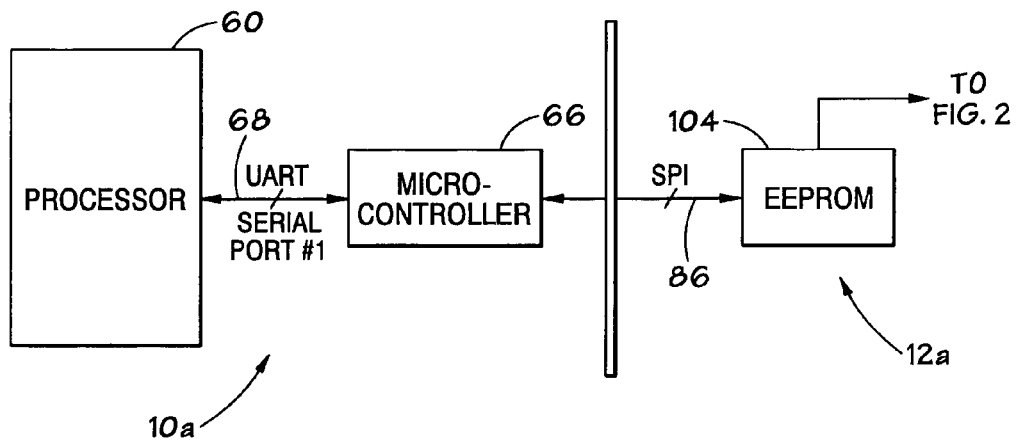
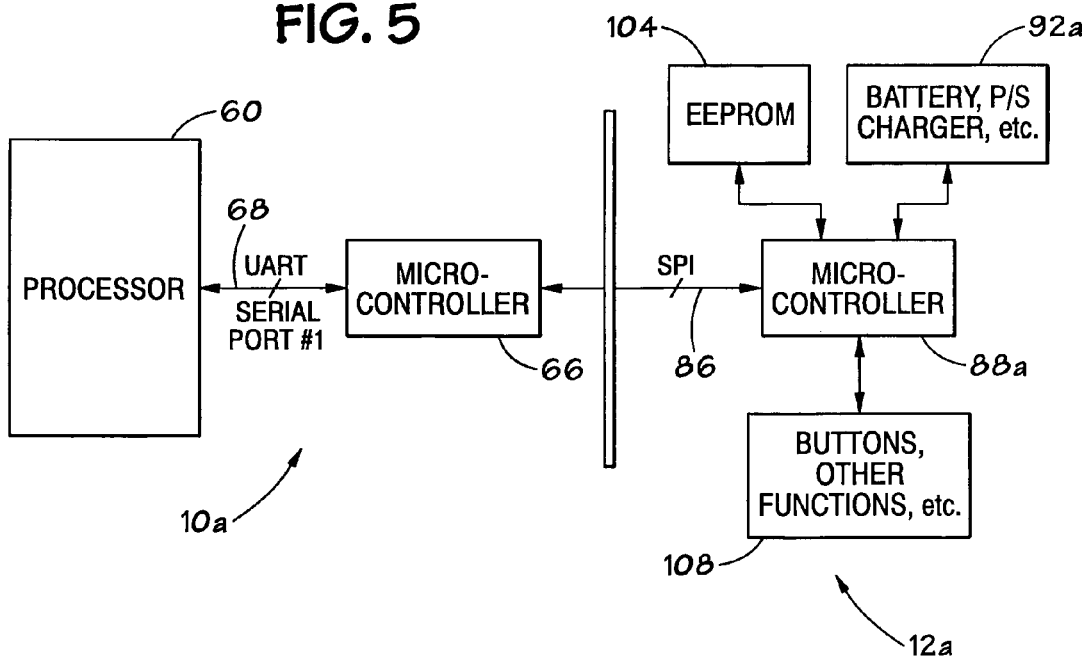

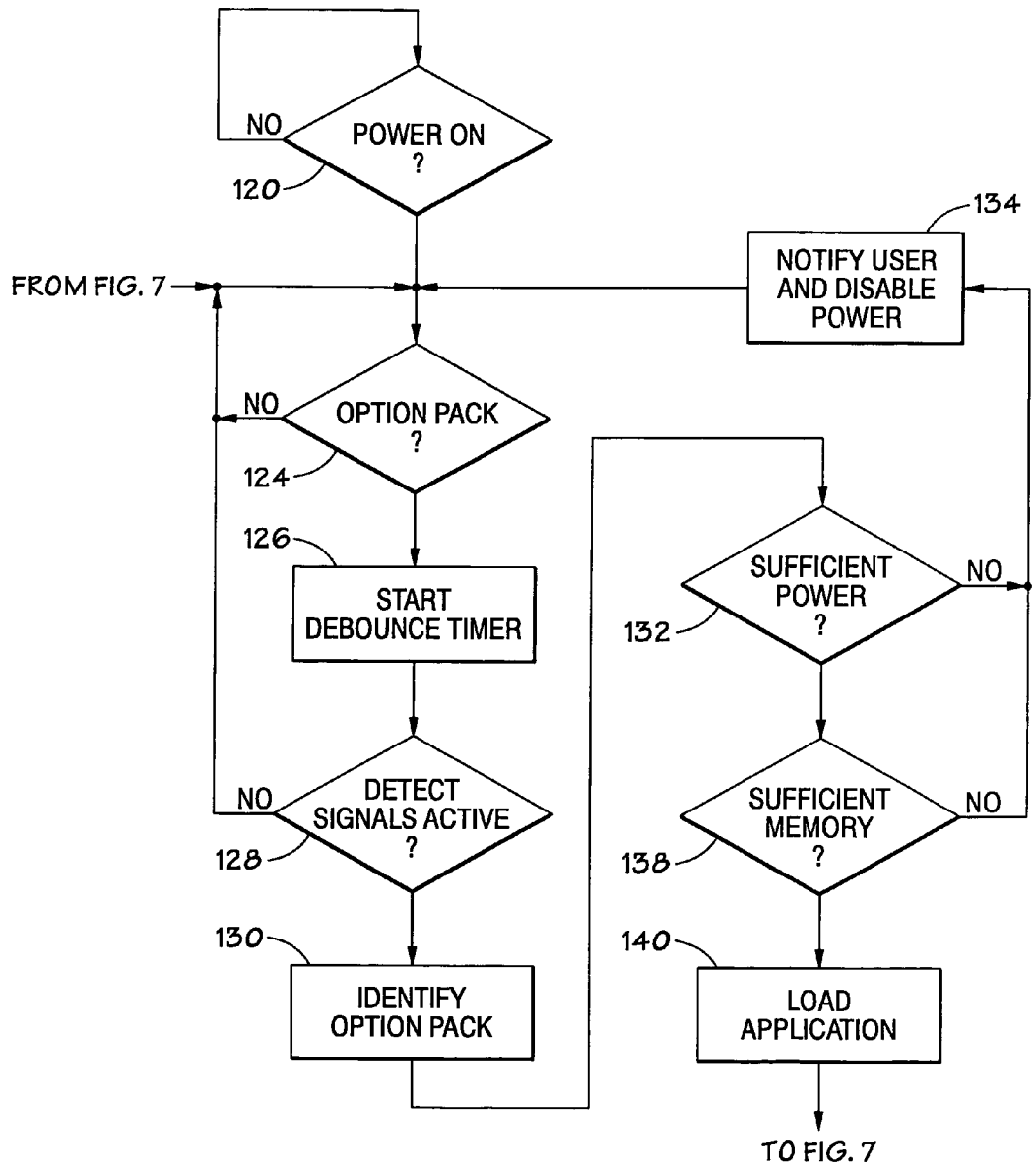

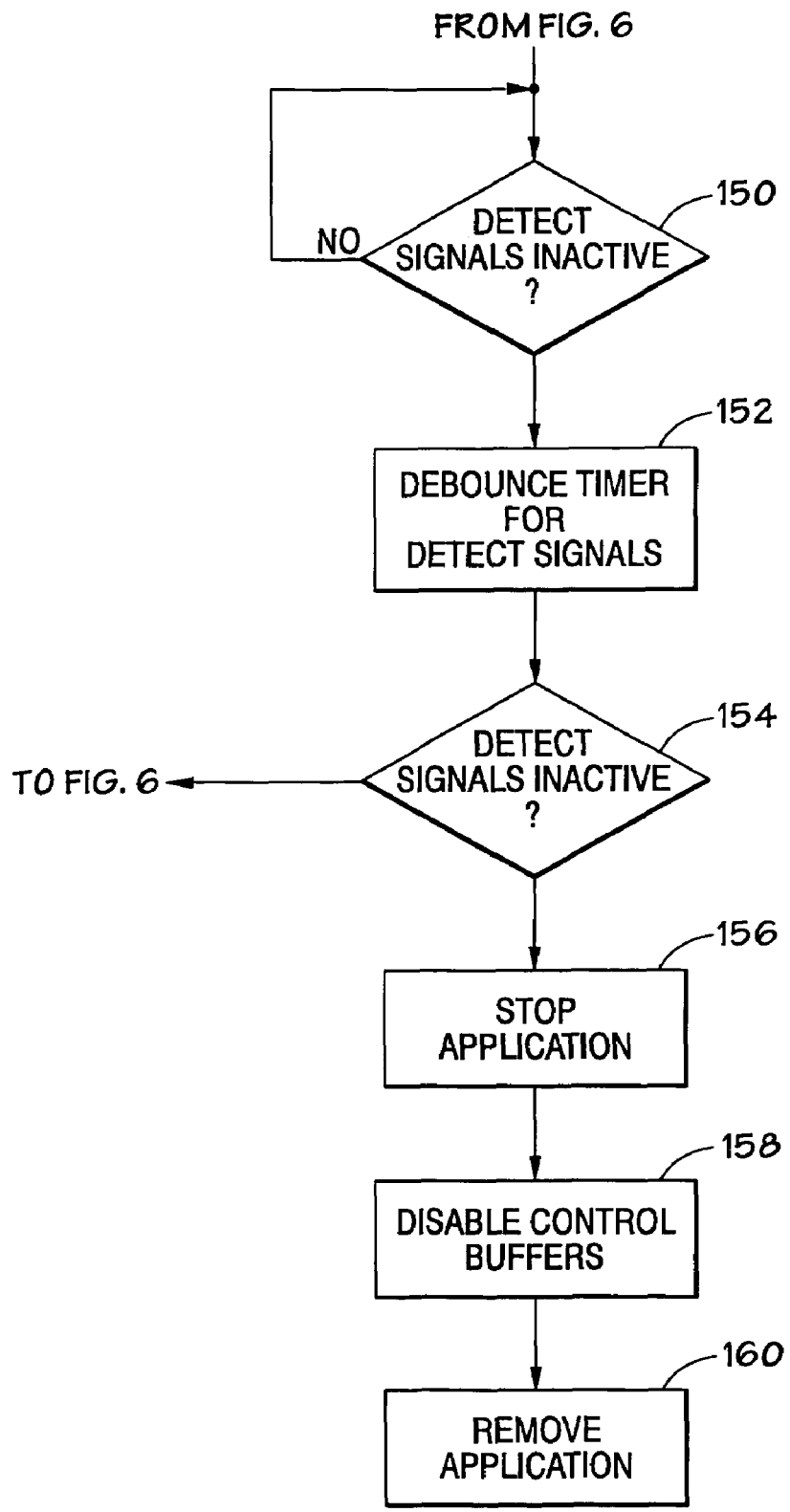

METHOD OF TRANSMITTING IDENTIFICATION DATA FROM AN OPTION PACK TO A MAIN UNIT BEFORE THE OPTION PACK IS FULLY POWERED

BACKGROUND OF THE INVENTION

1. Field of the Invention

The present invention generally relates to a handheld computer or personal digital assistant (PDA) and more particularly to an option pack for a PDA which comprises embedded software applications and drivers which automatically download onto a main unit upon installation.

2. Description of the Related Art

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Handheld computers or personal digital assistants (PDAs) are becoming increasingly useful in today's computer industry. Conventional PDA units typically provide a user with a handheld device which serves as an abbreviated version of a larger laptop and desktop computer system. They provide a user with an operating system and various software programs to accommodate scheduling, word processing, and a variety of other functions. Advantageously, these units comprise small, light-weight systems which provide a significant amount of computing power. However, it is clear that with the advantages of decreasing the size of a computing system, certain functional tradeoffs typically must be made. For extended computer use, complex computing tasks, and memory intensive applications, laptops and desktops are still virtually essential. Because laptops and desktops are larger, they have more memory and processing capabilities. Deciding what applications and functions to omit to sufficiently decrease the size of the computer unit offers a significant challenge.

To meet this challenge, PDAs are often equipped with streamlined base functions. Certain units may be off-the-shelf units with certain standard applications. Other units may be custom units which are designed in accordance with customer specifications. Still other units may provide for the downloading of software by a user, while other units may provide docking interfaces which allow portable option packs to be neatly coupled to the PDA to provide additional capabilities. The electrical interface, identification scheme, software exchange, and interface configuration between the option pack and the PDA provides a difficult challenge for designers.

The present invention may address one or more of the problems set forth above.

SUMMARY OF THE INVENTION

Certain aspects commensurate in scope with the disclosed embodiments are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

In accordance with one embodiment of the present invention, there is provided a method of implementing a personal digital assistant comprising a main unit and an option pack comprising the acts of: (a) coupling the option pack with the main unit, the option pack comprising a first memory device configured to store one or more applications and drivers associated with the one or more applications, and a second memory device configured to store identification data, the main unit comprising a device manager configured to receive the identification data from the second memory device, a power supply, and a third memory device; (b) transmitting the identification data from the first memory device to the device manager; and (c) downloading the one or more applications and associated drivers from the first memory device to the third memory device.

In accordance with another embodiment of the present invention, there is provided a method of inserting an option pack into a main unit of a personal digital assistant (PDA), comprising the acts of: (a) booting the main unit; (b) determining whether there is an option pack coupled to the main unit; (c) providing an interrupt signal from the option pack to the main unit; (d) interrupting the processing of the main unit; (e) notifying the main unit that the option pack is present; (f) transmitting identification information from the option pack to the main unit; and (g) downloading one or more software applications and associated drivers from the option pack to the main unit.

In accordance with still another embodiment of the present invention, there is provided a method of removing an option pack from a main unit of a personal digital assistant (PDA), wherein one or more applications and associated drivers have been downloaded to the main unit for use by the main unit, comprising the acts of: (a) de-activating one or more signals configured to detect the presence of the option pack in the main unit; (b) disabling control buffers; (c) terminating the functionality of the one or more applications running on the main unit; and (d) removing the one or more applications and associated drivers from the main unit.

BRIEF DESCRIPTION OF THE DRAWINGS

The foregoing and other advantages of the invention will become apparent upon reading the following detailed description and upon reference to the drawings in which:

FIG. 2 illustrates one embodiment of the electrical interface of the main unit;

FIG. 4 illustrates one embodiment of the Serial Peripheral Interface (SPI) on the option pack;

FIG. 5 illustrates an alternate embodiment of the Serial Peripheral Interface (SPI) on the option pack;

FIG. 6 is a flow chart illustrating an insertion and identification scheme in accordance with the present invention; and FIG. 7 is a flow chart illustrating a removal scheme in accordance with the present invention.

DETAILED DESCRIPTION OF SPECIFIC EMBODIMENTS

Figure 1A:
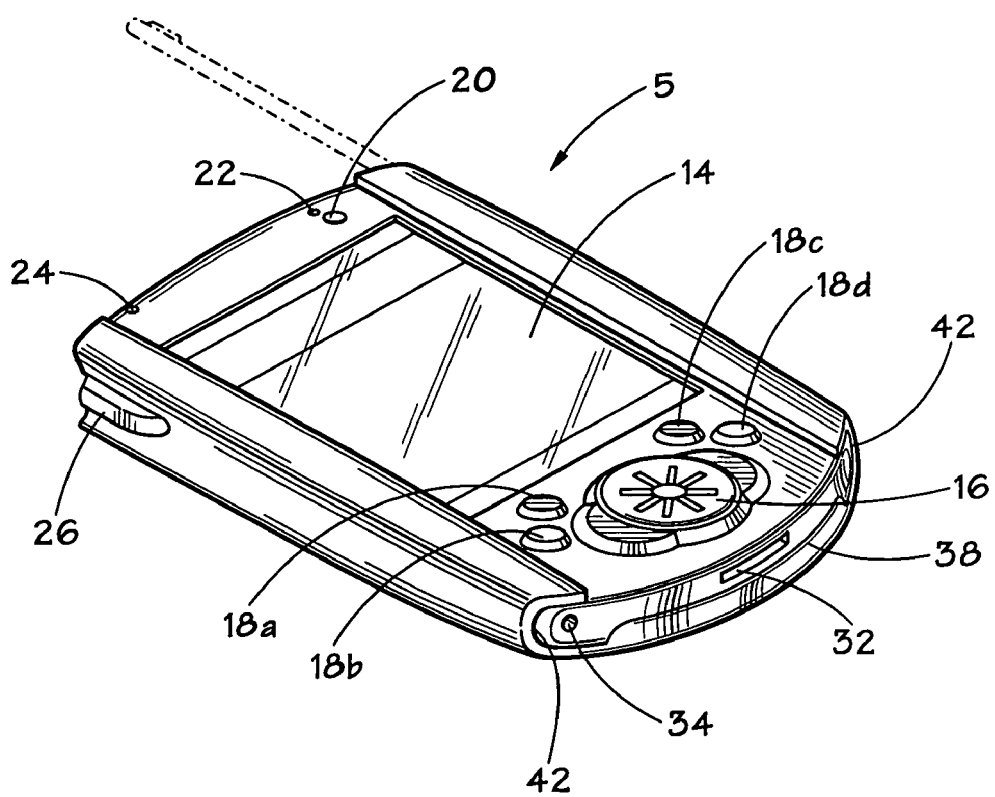
FIGS. 1A-1D illustrate a personal digital assistant (PDA), including a main unit and an option pack.

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The embodiment of a PDA described herein uses a modular approach to allow for customization and upgrading of the handheld device. The system described herein includes an electrical interface which provides the ability to add option packs to the main unit of the PDA. Once the option pack is electrically coupled to the main unit, a software application or option can be downloaded for use on the main unit. The electrical interface from the main unit to an option pack provides flexibility and personality to the PDA and allows for upgrading of existing and future technologies. The interface uses a generic interface card, such as a Personal Computer Memory Card International Association (PCMCIA), Compact Flash (CF), and Serial Peripheral Interface (SPI), to implement current technologies, along with custom features to enable leading edge technologies and support for vertical markets. It provides mechanisms for graceful insertion/removal, power enabling, battery charging and maintenance, and storage/downloading of software drivers and applications. Advantageously, the interface also provides hot-plugging capabilities, allowing the customer to change the option pack instantly with little or no interruption to the main unit and with no need to reboot the main unit. Further, many of the software applications and software drivers are stored on the option packs to conserve memory on the main unit and eliminate the process of downloading software from the Internet or a CDROM.

FIGS. 1A-1D illustrate one embodiment of a PDA 5, including a main unit 10 and an option pack 12. The main unit 10 is a portable unit comprising a plurality of controllers, processors, and memory chips to provide certain basic functions such as the implementation of scheduling or planning software, address referencing software, and word-processing software. The main unit 10 may include a display screen 14, joystick 16, and one or more launch keys 18a-d which may be used to launch software applications. Further, the main unit 10 may include a power button 20, a status light 22, a microphone 24, and a button to implement recording software 26. The top of the main unit 10 may include infrared sensors 28 and an audio jack 30. The bottom of the main unit 10 may include a synchronized serial connector 32, such as an RS232, a DC jack 34, and a main unit connector 36. The main unit connector 36 is configured to mate with an option pack connector 38.

Figure 1B:
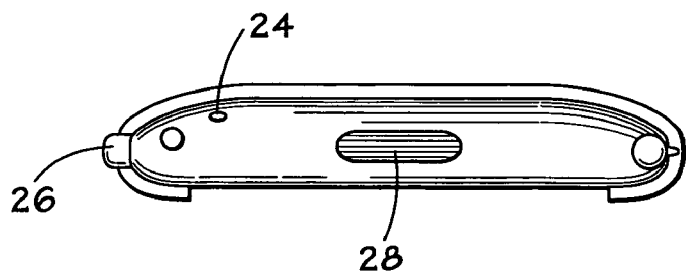
Figure 1C:
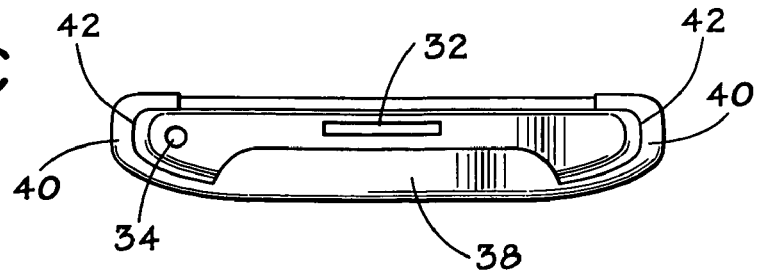
Figure 1D:
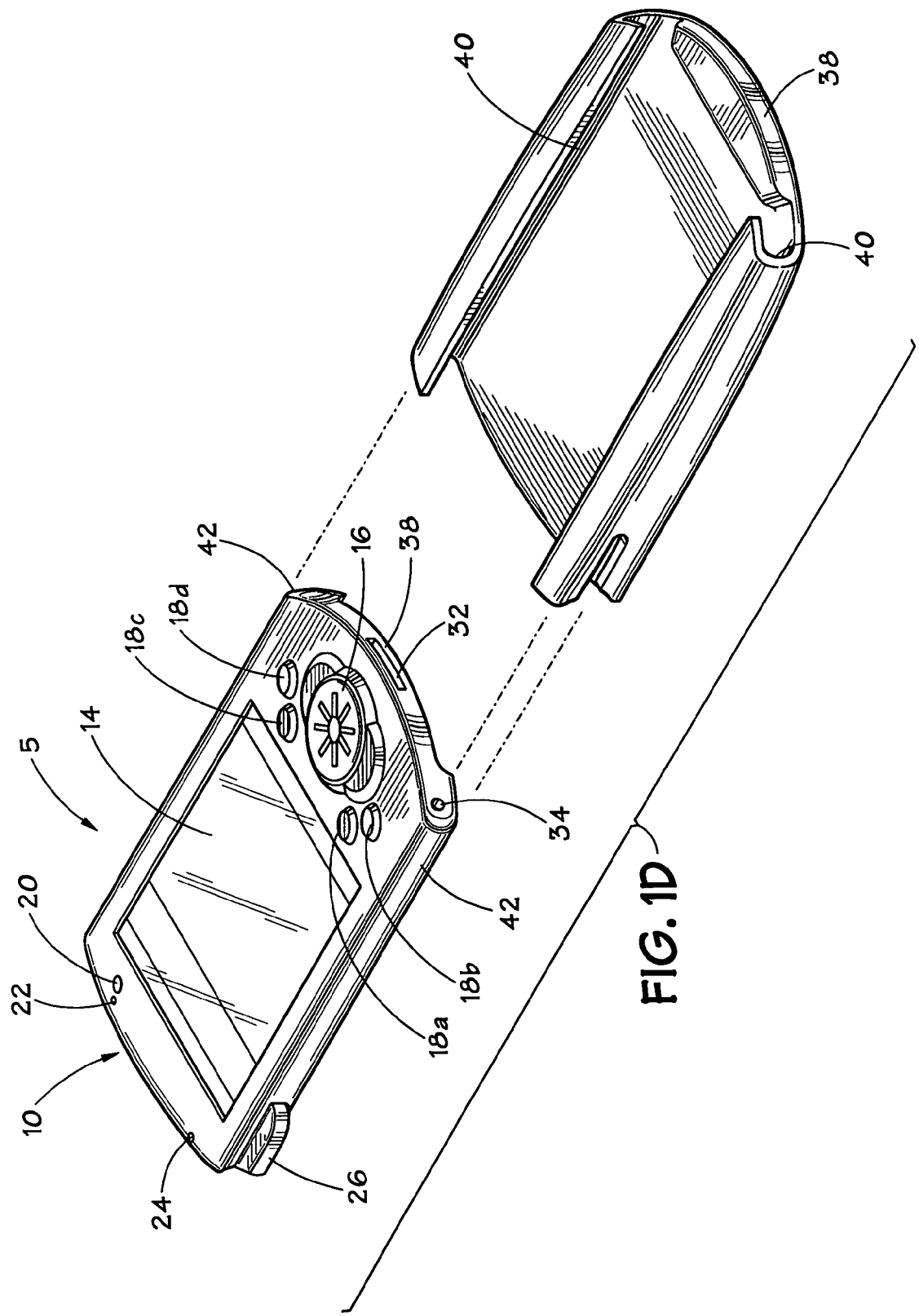

The main unit 10 is configured to receive an option pack 12. The option pack 12 may comprise a battery pack, additional memory, and/or software applications and drivers, for example. Guides 40 on the option pack 12 may be configured to slide securely along rails 42 to assist in the mating process between the main unit connector 36 and the option pack connector 38. FIG. 1A illustrates the main unit 10 and the option pack 12 coupled together and mated at the main unit connector 36 and option pack connector 38. FIGS. 1B and 1C illustrate a top and bottom view of FIG. 1A. FIG. 1D illustrates the mating process. Though it is not illustrated, it should be understood that the option pack 12 may be used to protect the face of the main unit 10 during non-operation of the PDA device 5. The option pack 12 is encased in a hard surface coating, such as plastic, to promote durability of the PDA 5 and provide protection to the face of the main unit 10 during non-operation. During non-operation, the option pack 12 may be flipped such that the option pack 12 covers the face of the main unit 10.

Figure 3:
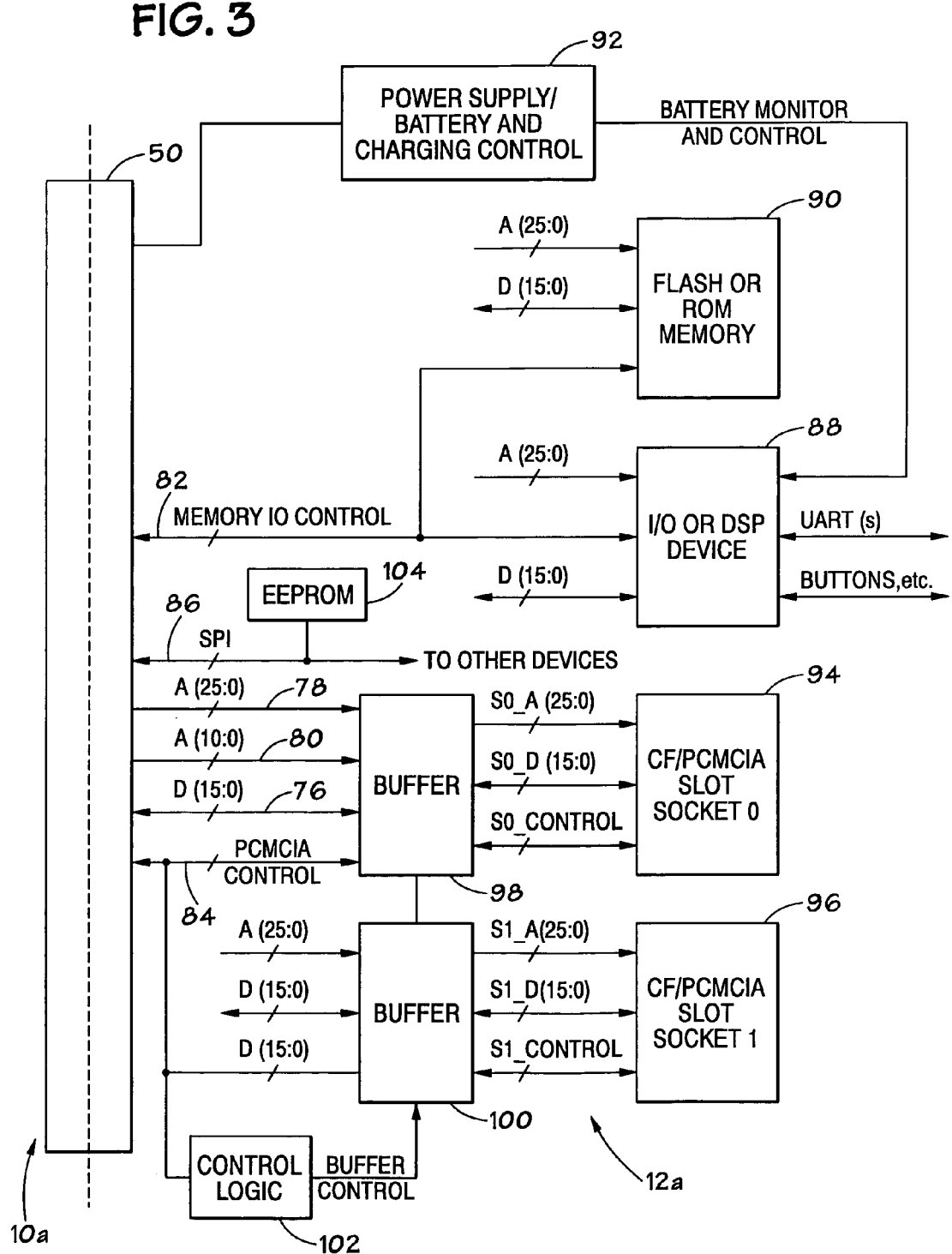
FIG. 3 illustrates one embodiment of the electrical interface of the option pack.

In an exemplary embodiment, the electrical connection between the main unit 10 and the option pack 12 may comprise a 100-pin connector and may include pins for two PCMCIA/CF devices, a 16/32-bit static memory/I/O interface, battery expansion, a SPI serial bus, and other miscellaneous functions. FIGS. 2 and 3 illustrate block diagrams of the main unit interface 10a and an exemplary implementation of an option pack interface 12a, respectively. For illustrative purposes, the term "main unit interface 10a" is used to refer to the main unit connector 36, the signals delivered to and received from the connector 36, and the main unit hardware associated with those signals. Likewise, the term "option pack interface 12a" is used to refer to the option pack connector 38, the signals delivered to and received from the connector 38, and the option pack hardware associated with those signals.

Referring initially to FIG. 2, the main unit interface 10a is illustrated. The joint electrical interface between the main unit 10 and the option pack 12 is illustrated as block 50. The joint electrical interface 50 refers to the coupled state of the main unit connector 36 and the option pack connector 38. The address signals 52, the data signals 54, and control signals, such as memory or I/O control signals 56 and PCMCIA control signals 58 from the processor 60, may be electrically coupled through the interface 50 through isolation buffers 62. The isolation buffers 62 may be bi-directional for bi-directional signals, or unidirectional for unidirectional signals. The logic flow of the isolation buffers 62 may be controlled by a Programmable Logic Device (PLD) 64. The main unit interface 10a may also comprise a micro-controller 66 configured to receive serial data on a Universal Asynchronous Receive and Transmit (UART) data bus 68. The main interface unit 10a may also be configured to transmit data on a Serial Peripheral Interface (SPI) data bus 70 to provide initial handshaking between the main unit 10 and the option pack 12. The low-level handshaking associated with the micro-controller 66 facilitates the exchange of identification data between the main unit 10 and the option pack 12. The SPI bus 70 also provides serial access for battery monitoring and charge control on the option pack 12. The option pack interface 12a may comprise an SPI EEPROM which provides for identification of the option pack 12 and the features it offers, as discusses with reference to FIG. 3.

The isolation buffers 62 are tri-stated when the main unit 10 is in idle mode or not accessing the option pack 12. It would be advantageous to design an option pack 12 such that the option pack 12 handles the tri-stating bus without drawing excessive current. Accordingly, pull-down or pull-up resistors (not shown) may be used on the signal lines. The address bus 52, A[25:0], and data bus 54, D[31:0], are used for parallel interfacing to PCMCIA/CF, static memory, and I/O devices. The various control signals for PCMICA/CF, static memory, and I/O (56 and 58) enable different functions on the option pack 12. A portion of the address bus 52, A[25:11], may be multiplexed with the upper bytes of the data bus 54, D[30:16], to provide a 32-bit data bus interface. The 32-bit interface can perform these accesses with an 11-bit address. Advantageously, the 32-bit data bus capability provides faster accesses for option packs that require high data throughput. Typically, the interface accesses 16-bit data with a 26-bit address bus.

The main unit interface 10a may also comprise a power supply, such as a battery 72 and a controller 74, for charging and monitoring a battery. The option pack data and address buses (D (31, 15:0), D (30:16) or A (25:11), A (10:0)) 76, 78, and 80 will be further described with reference to Table 2. The option pack memory control bus (MEMORY IO CONTROL) 82 and the option pack PCMCIA control bus (PCMCIA CONTROL) 84 will also be described with reference to Table 2. The option pack SPI data bus (SPI) 86 will be further described with reference to Table 3. The main unit 10 can supply power, typically at 3.3V, to an option pack 12. The electrical interface 50 includes various pins to control the charging and power supplies between the main unit 10 and option pack 12, as further described below.

FIG. 3 illustrates one embodiment of the option pack interface 12a. The option pack interface 12a provides a bus for the data signals 76, address signals 78 and 80, control signals 82 and 84, and SPI signals 86. The option pack interface 12a ensures that the signals being transferred between the main unit 10 and option pack 12 are delivered to the desired locations. The option pack interface 12a may include an I/O or DSP device 88, flash or ROM memory 90, a power supply and charging control 92, and/or one or more PCMCIA/CF devices. In the illustrated embodiment, the option pack interface 12a supports two PCMCIA/CF devices in the option pack 12, as indicated by blocks 94 (socket 0) and 96 (socket 1). If an option pack 12 has two PCMCIA/CF devices 94 and 96, it may include buffers 98 and 100 and control logic 102 to isolate the address, data, and control signals.

The option pack interface 12a may also support static memory 90 and I/O device 88 accesses through the MEMORY IO CONTROL signals 82. The option pack control signals may include chip selects to access different memory banks on the option pack 12. Each memory bank has specific types of cycles that it supports (i.e. flash, ROM, I/O, etc.). The main unit 10 can access various memory banks such as Static Memory banks, CF/PCMCIA memory banks, ROM memory banks, and the like, depending on the configuration of the option pack 12. An option pack memory map may be provided to indicate the different memory bank locations accessible to the main unit 10.

Further, each option pack interface 12a includes a memory device, such as EEPROM 104, which is used to store identification information about the specific option pack 12. The EEPROM 104 also contains information detailing the hardware, drivers, and software available on the option pack 12. The EEPROM 104 is coupled to the main unit 10 through the interface 50 by virtue of the SPI bus 86. Alternatively, the memory 90 and the EEPROM 104 may be a single programmable memory device.

Block 88 illustrates I/O and DSP devices. A DSP device may be used as a baseband control for a cell phone option pack, for instance. An I/O device may include a microcontroller to provide functions such as UART, button control, or battery monitoring, for instance. The configuration of the option pack 12 will vary depending on the functions available on the option pack 12. However, the logical signal flow through the interface 50 is easily modified to provide for alternate configurations of the option pack.

Table 1 defines the signal names and the pin out for one embodiment of the option pack connector 38. Here, a 100-pin connector is illustrated. Tables 2-4 include a more detailed breakdown of each of the signals included in Table 1. Each Table 2-4 is followed by a description of the signals.

TABLE 1

OPTION PACK PIN OUT

| Pin # | Name | Type | Description |
| --- | --- | --- | --- |
| 1 | CC_ETM | P/G | Trickle charge current pin |
| 2 | PCM_RESET | I | PCMCIA Reset |
| 3 | VS_EBAT | O | Extended battery sense |
| 4 | RD/WR# | I | Memory & I/O Read/Write# |
| 5 | GND | P/G | Main unit ground |
| 6 | RDY | O | Variable Latency I/O ready signal |
| 7 | CEN_ETM | OC | Charge current enable |
| 8 | RESET | I | GP reset for option pack |
| 9 | INT_OP | I | Option Pack Interrupt |
| 10 | CD_SCKT0# | O | PCMCIA socket 0 detect |
| 11 | PSKTSEL | I | PCMCIA Socket Select |
| 12 | PCM_CE2# | I | PCMCIA card enable |
| 13 | PCM_IORD# | I | PCMCIA IO Read |
| 14 | PCM_IOWR# | I | PCMCIA IO Write |
| 15 | D11 | I/O | PCMCIA/Memory Data |
| 16 | D12 | I/O | PCMCIA/Memory Data |
| 17 | D13 | I/O | PCMCIA/Memory Data |
| 18 | D14 | I/O | PCMCIA/Memory Data |
| 19 | D15 | I/O | PCMCIA/Memory Data |
| 20 | A17/D22 | I/O | PCM/Mem Address/Data |
| 21 | GND | P/G | Main unit ground |
| 22 | A18/D23 | I/O | PCM/Mem Address/Data |
| 23 | A19/D24 | I/O | PCM/Mem Address/Data |
| 24 | A20/D25 | I/O | PCM/Mem Address/Data |
| 25 | A21/D26 | I/O | PCM/Mem Address/Data |
| 26 | A22/D27 | I/O | PCM/Mem Address/Data |
| 27 | A23/D28 | I/O | PCM/Mem Address/Data |
| 28 | A24/D29 | I/O | PCM/Mem Address/Data |
| 29 | A25/D30 | I/O | PCM/Mem Address/Data |
| 30 | D08 | I/O | PCMCIA/Memory Data |
| 31 | GND | P/G | Main unit ground |
| 32 | D09 | I/O | PCMCIA/Memory Data |
| 33 | D10 | I/O | PCMCIA/Memory Data |
| 34 | D00 | I/O | PCMCIA/Memory Data |
| 35 | D01 | I/O | PCMCIA/Memory Data |
| 36 | D02 | I/O | PCMCIA/Memory Data |
| 37 | D31 | I/O | PCMCIA/Memory Data |
| 38 | PCM_REG# | I | PCMCIA IO cycle |
| 39 | PCM_WAIT# | O | PCMCIA Wait |
| 40 | SPI_DI | I | SPI Data In to option pack |
| 41 | SPI_CS# | I | SPI Chip Select |
| 42 | MCS2# | I | Memory Chip Select |
| 43 | MWE# | I | Memory Write Enable |
| 44 | MOE# | I | Memory Output Enable |
| 45 | GND | P/G | Main unit ground |
| 46 | EBAT_ON | O | Ext. battery power OK |
| 47 | OPT_ON | I | Option pack enable |
| 48 | V_ADP | P/G | Positive of AC adapter |
| 49 | V_EBAT | P/G | Positive of ext. battery |
| 50 | ODET2# | O | Option pack detect |
| 51 | ODET1# | O | Option pack detect |
| 52 | DQM2 | I | Memory & I/O byte enable |
| 53 | DQM3 | I | Memory & I/O byte enable |
| 54 | DQM0 | I | Memory & I/O byte enable |
| 55 | VDD | P/G | Main unit 3.3 V power |
| 56 | DQM1 | I | Memory & I/O byte enable |
| 57 | BATT_FLT | O | Extended battery fault |
| 58 | PCM_IRQ#0 | O | PCMCIA sckt 0 RDY/IRQ# |
| 59 | PCM_CE1# | I | PCMCIA card enable |
| 60 | PCM_OE# | I | CF Output enable pin |
| 61 | PCM_WE# | I | PCMCIA write enable |
| 62 | CD_SCKT1# | O | PCMCIA socket 1 detect |
| 63 | PCM_IRQ#1 | O | PCMCIA sckt 1 RDY/IRQ# |
| 64 | D03 | I/O | PCMCIA/Memory Data |
| 65 | D04 | I/O | PCMCIA/Memory Data |
| 66 | GND | P/G | Main unit ground |
| 67 | D05 | I/O | PCMCIA/Memory Data |
| 68 | D06 | I/O | PCMCIA/Memory Data |
| 69 | D07 | I/O | PCMCIA/Memory Data |
| 70 | A10 | I | PCMCIA/Memory Address |
| 71 | A11/D16 | I/O | PCM/Mem Address/Data |
| 72 | A09 | I | PCMCIA/Memory Address |
| 73 | A08 | I | PCMCIA/Memory Address |
| 74 | A13/D18 | I/O | PCM/Mem Address/Data |

TABLE 1-continued

OPTION PACK PIN OUT

| Pin # | Name | Type | Description |
|---|---|---|---|
| 75 | A14/D19 | I/O | PCM/Mem Address/Data |
| 76 | GND | | Main unit ground |
| 77 | A16/D21 | I/O | PCM/Mem Address/Data |
| 78 | A15/D20 | I/O | PCM/Mem Address/Data |
| 79 | A12/D17 | I/O | PCM/Mem Address/Data |
| 80 | A07 | I | PCMCIA/Memory Address |
| 81 | A06 | I | PCMCIA/Memory Address |
| 82 | A05 | I | PCMCIA/Memory Address |
| 83 | A04 | I | PCMCIA/Memory Address |
| 84 | A03 | I | PCMCIA/Memory Address |
| 85 | A02 | I | PCMCIA/Memory Address |
| 86 | GND | | Main unit ground |
| 87 | A01 | I | PCMCIA/Memory Address |
| 88 | A00 | I | PCMCIA/Memory Address |
| 89 | PCM_WP | O | PCMCIA WP/IOIS16# |
| 90 | A_OUTR | I | Right audio channel |
| 91 | A_OUTL | I | Left audio channel |
| 92 | A_GND | P/G | Analog GND for audio ONLY |
| 93 | MCS3# | I | Memory Chip Select |
| 94 | MCS4# | I | Memory Chip Select |
| 95 | VDD | P/G | Main unit 3.3 V power |
| 96 | SPI_SCK | I | SPI Clock Signal |
| 97 | MCHG_EN | I | Main battery recharging |
| 98 | V_ADP | P/G | Positive of AC adapter |
| 99 | V_EBAT | P/G | Positive of ext. Battery |
| 100 | SPI_DO | O | SPI Data Out from option pack |

KEY:
I: Input
O: Output
I/O: Bidirectional
P/G: Power, ground, battery or charging
OC: Open Collector
The "#" symbol denotes active low signal.

One configuration of the address and data signals are described in Table 2. However, it is noteable that the interface 50 also supports a 32-bit version of the PCMCIA interface. The 32-bit version of PCMCIA is only intended for use with custom designed logic. During the 32-bit operation, if any read or write is performed, the entire 32-bit bus is read or written. The 32-bit accesses align with "16-bit" address space as opposed to "8-bit" address space. Due to the limited number of pins on the option pack, the 32-bit operation only has an 11-bit address bus.

TABLE 2

PCMCIA/CF/MEMORY PIN DESCRIPTION

| SIGNAL NAME | DIR | PIN # | DESCRIPTION |
|---|---|---|---|
| A10-A00 (CF mode) | I | See above | PCMCIA/CF/Memory address pins used to address card or option pack in Memory, I/O or True IDE |
| A25-A11 (PCMCIA/Memory mode) | | | PCMCIA or memory address pins used to access devices in the option pack. These pins are shared with D31:D16. |
| D15-D00 (16-bit mode) | I/O | See above | Data pins used for 16-bit accesses in standard CF/PCMCIA, memory or I/O modes |
| D31-D16 (32-bit mode) | I/O | See above | Data pins for special accesses 32-bit read and write accesses in PCMCIA, CF or I/O modes. These pins are shared with A25:A11. |
| PCM_CE1#, PCM_CE2# | I | 59, 12 | PCMCIA/CF card enable for 8 or 16-bit select in memory and I/O mode. Functions as CS0# and CS1# in IDE mode |
| CD_SCKT0#, CD_SCKT1# | O | 10, 62 | PCMCIA/CF card detect pins for devices/slots 0 and 1. CD_SCKT0# represents logical OR of CD1# and CD2# of PCMCIA/CF pins for device/slot 0. |
| PCM_IORD# | I | 13 | PCMCIA/CF pin used in I/O and IDE modes as read strobe |
| PCM_IOWR# | I | 14 | PCMCIA/CF pin used in I/O and IDE modes as write strobe |
| PCM_OE# | I | 60 | PCMCIA/CF pin used as output enable strobe |
| PCM_IRQ#0, PCM_IRQ#1 | O | 58, 63 | PCMCIA/CF pins used in memory mode to determine card status for transfers. Used as an interrupt signal in I/O and IDE modes. IRQ#0 is for device/slot 0. |
| PCM_RESET | I | 2 | PCMCIA/CF reset pin |
| PCM_REG# | I | 38 | PCMCIA/CF pin used to distinguish between common and register memory in memory mode. |
| PCM_WAIT# | O | 39 | PCMCIA/CF pin to insert wait states in memory and I/O mode. Used as IORDY in True IDE mode. If there are two sockets in an option pack, the option pack must logically OR the WAIT# signals from each socket. |
| PCM_WE# | I | 61 | PCMCIA/CF pin used for write strobing in to CF card in memory and I/O modes. |
| PCM_WP | O | 89 | PCMCIA/CF pin used as write protect in memory mode. Used as IOIS16# in I/O and IDE modes for 16-bit operation. If there are two sockets in an option pack, the option pack must logically OR the WP/IOIS16# signals from each socket. |
| RDY | O | 6 | Ready signal for slow option pack devices to insert wait states on the variable latency I/O port |
| RD/WR# | I | 4 | Read/Write pin for variable latency I/O port |
| MCS[4:2]# | I | 94, 93, 42 | Memory bank chip select from processor to use address and data pins for memory or I/O cycles. |
| DQM[3:0]# | I | 53, 52, 56, 54 | Byte enables for the 32-bit data bus of the static memory and variable latency I/O port |

TABLE 2-continued

PCMCIA/CF/MEMORY PIN DESCRIPTION

| SIGNAL NAME | DIR | PIN # | DESCRIPTION |
|---|---|---|---|
| MOE# | I | 44 | Memory bank output enable from processor to use address and data pins for high bandwidth across option pack |
| MWE# | I | 43 | Memory bank write enable from processor to use address and data pins for high bandwidth across option pack |

As previously discussed, the electrical interface 50 includes PCMCIA support for up to two PCMCIA/CF sockets 94 and 96. Each 16-bit socket 94 and 96 supports 8-bit and 16-bit PC Cards and handles common memory, I/O, and attribute memory accesses. The PCMCIA/CF cards are enabled by the PCM_CE1# and PCM_CE2# signals. The PCMCIA memory space may be divided into eight partitions, four for each card slot, including partitions for common memory, I/O, attribute memory, and reserved space. Also, embedded inside the PCMCIA interface are the CF signals.

If an option pack includes more than one PCMCIA or CF socket, additional logic may be required on the option pack to support certain signals. The signals PCM_WAIT# and PCM_WP are outputs from each PCMCIA/CF socket 94 and 96 and are logically connected to form one signal for the electrical interface 50. In similar fashion, the CD[2:1]# signals from each socket are logically connected to form one CD signal, CD_SCKT1# and CD_SCKT2#, for each socket on the option pack interface 12*a*. The option pack interface 12*a* includes the PSKTSEL signal from the processor to determine which PCMCIA/CF socket 94 or 96 is accessed. The connector 38 also includes the following PCMCIA/CF pins: PCM_IORD#, PCM_IOWR#, PCM_OE#, PCM_IRQ#0, PCM_IRQ#1, PCM_RESET, PCM_REG#, and PCM_WE#.

The option pack interface 12*a* includes a static memory and I/O interface that uses the same address and data buses as the PCMCIA/CF interface. The static memory and I/O control signals differentiate the accesses from PCMCIA/CF with three chip select signals, MCS[4:2]#. MCS[4:2]# support ROM or flash memory, with MCS4# and MCS3# also supporting variable latency I/O. The data bus for each chip select region is programmable to be a 16-bit or 32-bit databus. In 16-bit designs, address bit 0 (A[0]) is not used. In 32-bit designs, address bits 1 and 0 (A[1:0]) are not used.

The variable latency I/O interface differs from static memory in that it allows the use of the data ready input signal, RDY, to insert a variable number of wait states. The variable latency I/O interface uses DQM[3:0] as byte enables, where DQM[3] corresponds to the most significant bit (MSB). The variable latency portion of the option pack interface 12*a* allows the main unit 10 to access slower devices such as micro-controllers and DSPs. A micro-controller on the option pack 12 can provide functions such as a UART, battery monitoring, button control, etc, as described in FIG. 3, with reference to block 88. Other memory signals, MWE# and MOE#, are implemented to complete the static memory and I/O interface. The RD/WR# signal is implemented for reading and writing on the variable latency I/O port.

The option pack connector 38 includes pins for the serial peripheral interface (SPI) for system management, identification and other low throughput functions as indicated in Table 3. The master SPI device is a microcontroller 66 (FIG. 2) on the main unit 10 that interfaces to a single slave SPI device on the option pack 12 such as an EEPROM 104. The option pack interface 12*a* includes the four standard SPI signals: SPI_DI, SPI_DO, SPI_CS# and SPI_SCK.

TABLE 3

SERIAL BUS INTERFACE PIN DESCRIPTION

| SIGNAL NAME | DIR. | PIN # | DESCRIPTION |
|---|---|---|---|
| SPI_SCK | I | 96 | Clock pin for the SPI interface. |
| SPI_DI | I | 40 | Data input pin for the SPI interface. Pin driven by main unit for data written to the option pack. |
| SPI_DO | O | 100 | Data output pin for the SPI interface. Pin is driven by option pack for data written to the main unit. |
| SPI_CS# | I | 41 | Chip select pin for the SPI interface. |

The SPI bus 86 is primarily used to identify option packs upon insertion via an EEPROM 104 on the option pack 12. The EEPROM 104 contains configuration, ID, control information and optionally contains bootstrap programs and OEM information.

It is also possible to use the SPI interface on the option pack 12 for low bandwidth data transmission for microcontrollers, battery management, etc. If an option pack requires multiple devices to communicate over the SPI interface, it may include a microcontroller to multiplex the devices on the SPI bus 86 as illustrated in FIG. 5. FIGS. 4 and 5 illustrate two possible implementations of the SPI interface on the option pack. The main unit interface 10*a* is the same in both figures. The processor 60 is coupled to the microcontroller 66 on the main unit 10 via a serial UART data bus 68. In FIG. 4, the SPI bus 86 is coupled directly to the EEPROM 104, as illustrated in FIG. 3. Alternatively, as in FIG. 5, the SPI bus 86 may be coupled to a microcontroller 88*a*. The microcontroller 88*a* is coupled to the EEPROM 104. By implementing the microcontroller 88*a* in this configuration, other devices such as a battery, power supply or charger, for instance, can communicate over the SPI bus 86, as illustrated by block 92*a*. Further, other functions and buttons 108 can utilize the SPI bus 86 through the microcontroller 88*a*.

If the option pack 12 includes a battery, it may implement most, if not all, of the battery signals as summarized in Table 4. The battery signals provide the ability to charge the option pack battery 92 simultaneously with the main unit battery 72 and, optionally, extend the battery life of the main unit 10. The batteries in the main unit 10 and the option pack 12 may be charged from multiple sources. The user can charge the batteries from the DC jack 34 (FIG. 1A) on the main unit 10, a DC jack (not shown) on the option pack 12, or through the synchronizing serial connector 32 on the main unit 10. This allows the main unit 10 and the option pack 12 to charge their respective batteries separately or at the same time.

TABLE 4

BATTERY SIGNAL PIN DESCRIPTIONS

| SIGNAL NAME | DIR. | PIN # | DESCRIPTION |
|---|---|---|---|
| V_ADP | P/G | 48, 98 | Positive DC voltage from AC adapter. Power can come from main unit or option pack. |
| MCHG_EN | I | 97 | Notifies option pack battery charger to limit its current. |
| V_EBAT | P/G | 49, 99 | Positive battery voltage from option pack to main unit. |
| CC_ETM | O | 1 | Charge signal from option pack extended battery to trickle charge the main battery. |
| CEN_ETM | OC | 7 | Signal from option pack that enables the extended battery to trickle charge the main battery. |
| VS_EBAT | O | 3 | Positive terminal sense line for extended battery |
| EBAT_ON | O | 46 | Notifies the main unit that the extended battery has sufficient energy to run the main unit. |
| BATT_FLT | O | 57 | Active-high signal that notifies the main unit that the option pack battery is below its critical low level. |

The V_ADP signals are the positive DC voltage from an AC adapter to charge the batteries. The V_ADP signals can be sourced from the main unit 10 or the option pack 12, since the AC adapter can be plugged into either one. When charging is sourced through the serial connector 32, the main unit 10 passes the charge to the option pack 12.

MCHG_EN is an active-high signal from the main unit 10 to notify the option pack 12 that the main battery 72 is charging so that the option pack 12 may limit its charging current to prevent blowing a fuse in the AC adapter. Typically, the option pack 12 should limit its charging current by one-half. If MCHG_EN is low, then the option pack 12 can charge its battery 92 at the full charge current.

The V_EBAT signals are the positive DC voltages from the option pack battery 92 to the main unit power supply 72 that provide extended battery life. Generally, these signals are only implemented when an option pack 12 is providing extended battery life to the main unit 10. The CC_ETM and CEN_ETM signals provide a mechanism for the option pack battery 92 to provide a trickle charge to the main battery 72. The trickle charge keeps the main battery 72 at a sufficient level to power the main unit 10 in the event the option pack 12 is removed while the unit is on. The CEN_ETM is an active-high, wired-ORed signal that enables the trickle charge from the option pack battery 92 to the main battery 72. The option pack 12 pulls this signal up to the extended battery voltage. The option pack 12 should pull CEN_ETM low when the AC adapter is plugged in or when the option pack battery 92 charge is too low. A current limiter, such as a MAX890L or a MAX893L (not shown), may exist on the option pack between the option pack battery 92 and the CC_ETM pin to limit the trickle charge.

VS_EBAT is the positive terminal sense line for the option pack battery 92. The main unit 10 uses it to determine if it should trickle charge the main battery 72 with the option pack battery 92. If VS_EBAT has a higher voltage than the main battery 72, CEN_ETM is driven by the option pack 12 to determine if the trickle charge is provided. If VS_EBAT has a lower voltage than the main battery 72, the main unit 10 pulls CEN_ETM (open collector) low and disables the trickle charge.

EBAT_ON is an active high signal driven by the option pack 12 to notify the main unit 10 that the option pack battery 92 has sufficient charge to power the main unit 10. It is only connected when the option pack battery 92 is designed to provide extended battery life to the main unit 10.

BATT_FLT is an active high signal that notifies the main unit 10 that the option pack battery 92 has reached its critical low voltage level, typically 3.4V. The main unit 10 then proceeds to shutdown the option pack 12 by forcing OPT_ON inactive (low).

Table 5 summarizes the audio, power, and ground signal pins. The interface includes seven ground signals and two power (3.3V) signals. The power and ground pins may be longer than the other signal pins on the main unit connector 36. This provides power and ground to the option pack 12 before the other signals make connection.

TABLE 5

POWER AND GROUND SIGNAL PIN DESCRIPTIONS

| SIGNAL NAME | DIR. | PIN # | DESCRIPTION |
|---|---|---|---|
| OPT_ON | I | 47 | Notifies option pack that it can run at full power. |
| A_GND | | 92 | Analog ground for wide audio. |
| A_OUTR, A_OUTL | I | 90, 91 | Line out right and left channels from main unit audio output |
| $V_{DD}$ | | 55, 95 | Analog ground for wide audio. |
| GND | | 5, 21, 31, 45, 66, 76, 86 | Ground |

When an option pack 12 is first connected to the main unit 10, the OPT_ON signal is a logical low signal, and thus, the option pack 12 can only draw a minimal current, such as 10 mA, from the $V_{DD}$ pins for identification. Once the main unit 10 asserts OPT_ON, an option pack 12 can draw the full current, such as 300 mA, from the main unit 10. By using the OPT_ON signal to control the current flow upon the coupling of the main unit 10 and the option pack 12, the main unit 10 will verify whether it has enough power and memory to accommodate the option pack 12. This provides a safeguard against over-loading or draining the resources on the main unit 10. The OPT_ON signal notifies the option pack 12 that it can turn on and run at full power. When an option pack 12 is first inserted, OPT_ON is low and the option pack 12 can only draw a minimal amount of current for identification. When OPT_ON signal is asserted, the option pack 12 can draw the maximum allowed current from the $V_{DD}$ pins. Also, the option pack 12 uses the power ($V_{DD}$) and ground (GND) signals to detect whether it is connected to the main unit 10, so it can enable the power supply and other functions on the option pack.

A_GND is the ground associated with the analog audio portion of the main unit 12. It is only connected to option packs that use the A_OUTR and A_OUTL signals and should route directly to the analog audio section of the option pack 12. A_OUTR and A_OUTL are line out signals from the right and left channels of the main unit's audio codec. These signals correspond directly to the audio signals used for the speaker and headphone outputs of the main unit 10. If an option pack 12 uses these signals, it must amplify them for an option pack audio out function and connect the A_GND signal to the analog ground of the option pack.

The option pack interface 12a also includes other signals to provide insertion/removal detection, reset, audio, and interrupt functions as summarized in Table 6. INT_OP is an active high signal that allows the option pack 12 to interrupt the main unit 10 for various functions such as event notification, data transfer, etc. This signal is pulled low on the main unit 10.

TABLE 6

MISCELLANEOUS SIGNAL PIN DESCRIPTIONS

| SIGNAL NAME | DIR. | PIN # | DESCRIPTION |
|---|---|---|---|
| INT_OP | O | 9 | Option pack general-purpose interrupt used for various functions such as FIFO maintenance, polling, etc. |
| RESET | I | 8 | General purpose reset for option pack. |
| ODET1#, ODET2# | O | 51, 50 | Option pack detect signals. These signals generate an interrupt when the option pack is inserted or removed. |
| PSKTSEL | I | 11 | PCMCIA/CF Socket select pin for option packs with two sockets. |

The RESET signal is a general-purpose reset signal from the main unit 10 and is an active high signal. RESET is only active for a short duration such as 100 ms (default setting) after OPT_ON is asserted when the option pack 12 is inserted.

The ODET[2:1]# signals notify the main unit 10 when an option pack 12 is inserted or removed. These signals are pulled high (3.3V) on the main unit 10 and the option pack 12 should tie them low. Upon insertion, the signals interrupt the processor 60 and the routine goes through the process of identifying the option pack 12 through the SPI signals (70 and 86). Upon removal, the signals go high and again interrupt the processor 60 to notify the system. Advantageously, the ODET[2:1]# pins may be shorter (eg. by 0.5 mm) than normal I/O pins and shorter (eg. 1.0 mm) than the power pins. This implementation ensures that the option pack 12 is fully inserted before the main unit 10 communicates with the option pack 12.

The aforementioned interface can be implemented to provide an insertion and identification scheme between the main unit 10 of a PDA 5 and an option pack 12 in accordance with the present techniques. One of the advantages of the present scheme is that a user can remove one option pack and insert another without significantly interrupting the system.

In one embodiment of the PDA 5, upon insertion of the option pack 12, the option pack interface 12a invokes a device manager such as a micro-controller 66 on the main unit 10 that interrogates the option pack 12 on its features without significantly impacting battery life. The interrogation includes data on drivers, software applications, configuration, a bootstrap program, and miscellaneous requirements of the option pack 12. Advantageously, this identification process allows the option pack 12 to store information, drivers and applications on the option pack 12, so the main unit does not have to use its memory to store information on a large number of option packs. In one configuration, all of the software options and drivers may be embedded on the option pack 12. This embodiment also allows the main unit 10 to remove the drivers and applications from memory automatically when the option pack 12 is disconnected from the main unit 10, thereby freeing valuable memory space on the main unit 10.

FIG. 6 illustrates an insertion sequence in accordance with the present technique. Initially, the algorithm checks to see if the power is on in the main unit 10, as in block 120. Next, the main unit 10 determines whether there is an option pack 12 inserted, as in block 124. If an option pack 12 is inserted, the option pack detect signals ODET[2:1]# interrupt the processor 60 to notify the system. The interrupt routine starts a timer to allow the detect signals to debounce, as in block 126. Once the timer times out, the interrupt routine checks to verify that the detect signals are still active, as in block 128. If the signals are inactive the sequence starts over. If the detect signals are still active, the interrupt routine enables a serial interface 86, such as SPI or I2C, and the $V_{DD}$ pins on the option pack connector 38. In this state, the option pack 12 only draws a minimal amount of current (e.g. 10 mA) for identification and power management purposes. The main unit 10 then identifies what options are available on the present option pack 12 by downloading the identification information from a memory device, such as an EEPROM 104, via the serial interface 86, as in block 130. The information which is downloaded from the option pack 12 is discussed further with reference to Tables 7-18, below. It should be understood that the format and structure of the information stored in the EEPROM 104 may be varied without abandoning the scope of the present embodiment.

Once the option pack 12 is identified (block 130), the main unit 10 determines whether it has enough battery life to power the option pack 12 fully, as in block 132. If the main unit 10 does have sufficient power, a message may be displayed on the display screen 14 giving a user the option to enable the option pack 12 and consume power, or decline and enable it at a later time, as is block 134. However, the user notification may be omitted. Some option packs comprising an extended battery or a low power device may not include this step. If there is not enough power on the main unit 10 to power the option pack 12, the option pack 12 is not enabled, as in block 134. The main unit 10 removes power to the $V_{DD}$ pins and disables the SPI interface 86.

If there is enough memory on the main unit 10, and after the detection and notification to enable power (either from a user, or automatically), the main unit 10 powers the remaining buffers for the entire interface into a high impedance state. The OPT_ON signal is asserted to enable the option pack to power on. At this point, the option pack 12 will consume full power and draw full current (e.g. 300 mA). This enables the full interface between the main unit 10 and the option pack 12. The main unit 10 may then determine whether it has enough memory space to download the applications present on the option pack 12, as in block 138. Once the device manager obtains the information the drivers and applications and determines that it has enough memory to accommodate the applications and drivers which are present on the option pack 12, the device manager searches the larger flash memory 90 for the applications identified by the EEPROM 104 as being present on the option pack 12. The device manager may be a driver or software application stored in the microcontroller 66. The applications and drivers from the flash memory 90 are downloaded to the main memory of the main unit 10, and the application may be launched, as in block 140. If there is not enough memory to support the option pack 12, the option pack 12 is not enabled, as in block 134. The main unit 10 removes power to the $V_{DD}$ pins and disables the SPI interface 86.

The option pack interface 12a may also support additional flash memory with a parallel interface tied directly to the flash/ROM memory 90 for applications and drivers too large for the serial memory device (EEPROM 104). In this embodiment, the information in the EEPROM 104 is used to locate the data in the larger flash/ROM memory 90.

The removal process is illustrated in FIG. 7. If the option pack is removed while the system is on or in hibernation, the option pack detect signals, ODET[2:1]#, interrupt the processor to notify the system that the detect signals are inactive, as in block 150. The device manager starts a timer to allow the detect signals to debounce, as in block 152. Once the timer times out, it checks to verify the detect signals are still inactive, as in block 154. If the signals are active (option pack still installed) the sequence starts over. If the detect signals are inactive, the device manager subsequently deasserts OPT_ON (block 156), disables the buffers (block 158), and removes power to the $V_{DD}$ pins. The application is also removed from the main unit 10 (block 160) to reduce the use of the memory in the main unit 10. For instance, the one or more applications and associated drivers may be uploaded from the main unit 10 back to the option pack 12.

Upon insertion of the option pack 12, a "device manager" type driver on the main unit 10 interrogates the option pack and starts the appropriate drivers. The micro-controller 66 enables the serial interface 86 and the power supply pins $V_{DD}$ to start downloading information from a memory device, such as an EEPROM 104, on the option pack 12. The device manager uses the information from the EEPROM 104 to locate drivers and applications, enable interrupts, determine memory specifications and type, power consumption, slot configuration, etc. The device manager loads the option pack drivers and applications based on the information in the EEPROM 104.

The memory device on the option pack 12 (here EEPROM 104) includes information on the drivers, applications, bootstrap, hardware, and OEM. Table 7 illustrates one configuration of the memory data structure in the EEPROM 104.

TABLE 7

MEMORY DATA STRUCTURE

| OPTION PACK INFORMATION | DESCRIPTION |
| --- | --- |
| ID Information | Mandatory information that Identifies the option pack. |
| Control information | This is optional information that identifies what drivers are needed. |
| Driver table | Used to Identify the drivers that might not have been present in the original unit. |
| Configuration | Specific configuration information on the option such power consumption, battery capacity, etc. |
| Bootstrap program | If needed an OEM may store a bootstrap program in this region. |
| Optional OEM area | This is a free-form area it will be the OEM's responsibility to lay out this area. It could be used to store software keys, option pack parameters, etc. |

The first segment of the memory data structure (Table 7) is the ID Information which is used to identify the information stored in the application or option including data length, high-level hardware description, address of bootstrap, and application name. It also includes a version indicator, vendor and product ID and the address of the OEM information. Each segment of the memory data structure comprises a terminator to indicate the end of that segment. Table 8 illustrates one configuration of the data structure of the ID Information.

TABLE 8

ID INFORMATION

| FIELD # | NAME | TYPE | LENGTH | DESCRIPTION |
| --- | --- | --- | --- | --- |
| 1 | Start of ID | | 1 b | 0xaa |
| 2 | Length of data | integer | 4 b | Used by the ID API to allow for a block read of Identification information. The number in this field should include ALL information in the EEPROM including the information stored in the OEM area. |
| 3 | Version Indicator | integer | 1 b | Used to determine format of information. Currently, defaulting to 0x01. |
| 4 | Vendor ID | Integer | 2 b | Unique vendor ID (Compaq Assigned) |
| 5 | ID Number | integer | 2 b | Unique per vendor Product ID |

TABLE 8-continued

ID INFORMATION

| FIELD # | NAME | TYPE | LENGTH | DESCRIPTION |
|---|---|---|---|---|
| 6 | Text Description | String | Variable | Text description for display to user. Zero delimited. |
| 7 | Type | Integer | 1 b | Identifies type of option pack<br>2 - Minimal Hardware<br>3 - Data Bus<br>4 - Bootstrap present |
| 8 | Initial Power State | BYTE | 1 b | 'Y'/'N' |
| 9 | Suspend Power State | BYTE | 1 b | 'Y'/'N' |
| 10 | Time Reset Width | BYTE | 1 b | |
| 11 | Bootstrap address | | | Address of the Bootstrap program in this EEPROM |
| 12 | OEM Information address | | | Address of OEM Information in this EEPROM |
| 13 | Application name | char | Variable | Null Terminated field; contains the name of the application to start on the option pack flash. i.e. "myprog.exe parm1 parm2" |
| 14 | Terminator | | 4 b | Marks end of ID information Value. 0x0f0f0f0f |

The next segment of the memory data structure (Table 7) is the control information which is included anytime additional drivers are needed to operate the option pack. The control information includes a list of the drivers needed and identifies additional entries in the driver table. The Vendor ID and Driver ID are combined to create a unique key for the device manager (micro-controller 66) to use when looking up the driver. Table 9 illustrates one configuration of the data structure of the control information.

The third segment of the memory data structure (Table 7) is the Driver table information which represents the information needed to start the drivers dynamically. It is option-ally stored on the option pack 12 as a way to extend the driver table being maintained in the main unit 10. This information is similar to the information stored in the registry of the main unit 10.

Table 10 shows a list of the drivers that are optionally stored in the option pack flash memory 90. Multiple drivers may be used, but only the drivers that are included in the Control Information (loaded from the option pack flash memory 90). It is possible to combine the Vendor ID and Driver ID to create a unique key for the device manager to use when looking up the driver.

TABLE 9

CONTROL INFORMATION

| FIELD # | NAME | TYPE | LENGTH | DESCRIPTION |
|---|---|---|---|---|
| 1 | Start of Control | Integer | 1b | 0xbb - Occurs once per Control Information block. |
| 2 | Vendor ID | Integer | 4b | Identifies the vendor that supplied the driver. Part of unique key when combined with the Driver ID. |
| 3 | Driver ID | Integer | 4b | Identifies the driver to be loaded |
| 4 | Memory location | Integer | 4b | Memory location for driver to be using |
| 5 | Stop Memory location | Integer | 4b | Ending memory location |
| 6 | Control information Terminator | | 4b | Value: 0x0f0f0f0f - Occurs once per Control Information block. |

TABLE 10

DRIVER TABLE

| FIELD # | NAME | TYPE | LENGTH | DESCRIPTION |
|---|---|---|---|---|
| 1 | Vendor ID | Integer | 4b | Vendor Identifier |
| 2 | Driver ID | Integer | 4b | Driver Identifier |
| 3 | Driver | String | Variable | File name of driver, i.e. Driver.dll |
| 4 | Display name | String | Variable | Display name of driver |
| 5 | Stream prefix | String | 3 | Identifies the prefix for the Stream interface. I.e. "COM" |
| 6 | Record Terminator | char | 1b | 0x03 |
| 7 | Section Terminator | | | 0x0f0f0f0f - Occurs once per Driver Table block. |

The fourth segment of the memory data structure (Table 7) is the Configuration Information which provides data about the option pack hardware such as battery capacity, power consumption, socket configuration, serial memory size, flash memory configuration, etc. This information provides the micro-controller 66 with the ability to make decisions regarding power consumption, memory size and timing, etc. Table 11 illustrates one configuration of the data structure of the Configuration Information. Tables 12-16 provide a more detailed description of exemplary embodiments of the fields in the Configuration Information segment of the memory data structure.

TABLE 11

CONFIGURATION INFORMATION

| FIELD # | NAME | TYPE | LENGTH | DESCRIPTION |
|---|---|---|---|---|
| 1 | Serial Memory Size | Integer | 1b | Identifies the EEPROM size in bytes |
| 2 | Slot Configuration | Integer | 1b | Identifies PCMCIA/CF Slots |
| 3 | Interrupt Configuration | Integer | 1b | Identifies option pack interrupt |
| 4 | Flash Memory Config | Integer | 2b | Information on option pack flash memory |
| 5 | Battery & Power Supply Configuration | Integer | 2b | Information on option pack battery and power supplies |
| 6 | Section Terminator | | | 0x0f0f0f0f |

The Serial Memory field from the Configuration Information segment (Table 11) describes the total size of the serial memory used on the option pack 12. The hex values may correspond to various memory sizes, as illustrated in Table 12.

TABLE 12

SERIAL MEMORY

| Serial Memory Size (bytes) | Hex Value |
|---|---|
| RFU | 00 |
| 32 | 01 |
| 64 | 02 |
| 128 | 03 |
| 256 | 04 |
| 512 | 05 |
| 1024 | 06 |
| 2048 | 07 |
| 4096 | 08 |
| 8192 | 09 |
| 16384 | 0A |
| 32768 | 0B |
| 65536 | 0C |
| 131072 | 0D |
| RFU | 0E through FF |

The Slot Configuration field from the Configuration Information segment (Table 11) describes the PCMCIA/CF slot(s) or embedded device(s) in the option pack 12 and may be allocated as set forth in Table 13.

TABLE 13

SLOT CONFIGURATION

| Bit 7 | Bit 6 | Bit 5 | Bit 4 | Bit 3 | Bit 2 | Bit 1 | Bit 0 |
|---|---|---|---|---|---|---|---|
| RFU | Device #2 embedded or slot | Device #2 PCMCIA or CF* | PCMCIA or CF device #2 present | RFU | Device #1 embedded or slot | Device #1 PCMCIA or CF* | PCMCIA or CF device #1 present |
| 0 | 1: Embedded 0: Slot | 1: PCMCIA 0: CF | 1: Present 0: None | 0 | 1: Embedded 0: Slot | 1: PCMCIA 0: CF | 1: Present 0: None |

NOTE:
*If bits 0 or 4 are 0, the corresponding bits are not applicable and should be set to 0.

The Interrupt Configuration field from the Configuration Information segment (Table 11) describes the interrupt utilization on the option pack 12 and may be allocated as set forth in Table 14. The Interrupt Configuration field also provides information about the presence of other memory slots that are in the option pack.

TABLE 14

INTERRUPT CONFIGURATION

| Bit 7 | Bit 6 | Bit 5 | Bits 4:1 | Bit 0 |
|---|---|---|---|---|
| Sony Memory Stick Slot | MMC Slot | SD Memory Card Slot | RFU | Interrupt signal INT_OP, connected |
| 1:Present 0:None | 1:Present 0:None | 1:Present 0:None | 0 | 1:Connected 0:Not Connected |

The Flash Memory fields from the Configuration Information segment (Table 11) describes the flash memory size and timing in the option pack 12 and may be allocated as set forth in Table 15.

TABLE 15

FLASH MEMORY CONFIGURATION

| Bit 7:5 Amount of Flash Installed | Bits 4:2 RFU | Bit 1 Type | Bit 0 Flash Memory Installed |
|---|---|---|---|
| Memory bank #2 (MCS2#) | | | |
| 000 1 MB 100 16 MB<br>001 2 MB 101 32 MB<br>010 4 MB 110 64 MB<br>011 8 MB 111 128 MB | 00 | 1:Intel Strata<br>0:Other | 1:Present 0:None |
| Memory bank #3 (MCS3#) | | | |
| 000 1 MB 100 16 MB<br>001 2 MB 101 32 MB<br>010 4 MB 110 64 MB<br>011 8 MB 111 128 MB | 00 | 1:Intel Strata<br>0:Other | 1:Present 0:None |

The Battery and Power Supply Configuration fields from the Configuration Information segment (Table 11) describes the battery and power supply 92 of the option pack 12. It helps determine if an option pack can support PCMCIA and CF cards. Multiplying the mantissa times the exponent represents the maximum current for the power supply in the option pack. One allocation of the Battery and Power Supply Configuration field is set forth in Table 16.

TABLE 16

BATTERY AND POWER SUPPLY CONFIGURATION

| Bits 7:6 5.0 V Power Supply Exponent for maximum current* | Bits 5:4 3.3 V Power Supply Exponent for maximum current* | Bit 3 RFU | Bit 2 5.0 V Supply Present | Bit 1 3.3 V Supply Present | Bit 0 Battery Present |
|---|---|---|---|---|---|
| 00  1 mA | 00  1 mA | 0 | 1:Present | 1:Present | 1:Present |
| 01  10 mA | 01  10 mA | | 0:None | 0:None | 0:None |
| 10  100 mA | 10  100 mA | | | | |
| 11  1A | 11  1A | | | | |

| Bits 7:4 5.0 V Mantissa for maximum current* | | Bits 3:0 3.3 V Mantissa for maximum current* | |
|---|---|---|---|
| Mantissa (Hex) | Value | Mantissa (Hex) | Value |
| 0 | 1.0 | 0 | 1.0 |
| 1 | 1.2 | 1 | 1.2 |
| 2 | 1.3 | 2 | 1.3 |
| 3 | 1.5 | 3 | 1.5 |
| 4 | 2.0 | 4 | 2.0 |
| 5 | 2.5 | 5 | 2.5 |
| 6 | 3.0 | 6 | 3.0 |
| 7 | 3.5 | 7 | 3.5 |
| 8 | 4.0 | 8 | 4.0 |
| 9 | 4.5 | 9 | 4.5 |
| A | 5.0 | A | 5.0 |
| B | 5.5 | B | 5.5 |
| C | 6.0 | C | 6.0 |
| D | 7.0 | D | 7.0 |
| E | 8.0 | E | 8.0 |
| F | 9.0 | F | 9.0 |

NOTE:
*If the 3.3 V or 5.0 V is not present, the corresponding exponent and mantissa values are not applicable and set to all zeroes.

The fifth segment of the memory data structure (Table 7) is the Bootstrap Program field, which is a binary program in an "exe" format to bootstrap option packs that do not have a dedicated ROM memory bank. It is copied into the main unit's file system for execution. One configuration of the Bootstrap Program field is illustrated in Table 17.

TABLE 17

BOOTSTRAP PROGRAM

| FIELD # | NAME | TYPE | LENGTH | DESCRIPTION |
|---|---|---|---|---|
| 1 | Size of Bootstrap | DWORD | 4 b | Size of bootstrap in bytes |
| 2 | Bootstrap program | Binary | Variable | Binary data in "exe" format |
| 3 | Section Terminator | DWORD | 4 b | 0x0f0f0f0f |

The sixth segment of the memory data structure (Table 7) is the OEM Area which is an optional field segment. The OEM Area segment may include such information as part numbers, serial numbers, revision history, manufacturing date, etc. The field comprises all remaining memory following the bootstrap segment. A terminator to mark the end of the memory block may be required as with the Section Terminator used for the other segments.

TABLE 18

OEM AREA

| FIELD # | NAME | TYPE | LENGTH | DESCRIPTION |
|---|---|---|---|---|
| 1 | Size of OEM Area | DWORD | 4 b | Size of OEM area in bytes |
| 2 | OEM Data | Binary | Variable | OEM Data |
| 3 | Section Terminator | DWORD | 4 b | 0x0f0f0f0f |

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A method of implementing a personal digital assistant comprising a main unit and an option pack comprising the acts of:
   (a) coupling the option pack with the main unit, the option pack comprising a first memory device configured to store one or more applications and drivers associated with the one or more applications, and a second memory device configured to store identification data, the main unit comprising a device manager configured to receive the identification data from the second memory device, a power supply, and a third memory device, wherein the first memory device is different from the second memory device;
   (b) transmitting the identification data from the second memory device to the device manager, before the option pack is fully powered; and
   (c) downloading the one or more applications and associated drivers from the first memory device to the third memory device.

2. The method of implementing a personal digital assistant, as set forth in claim 1, wherein act (a) comprises coupling the option pack with the main unit via a 100-pin connector.

3. The method of implementing a personal digital assistant, as set forth in claim 1, wherein the device manager comprises a driver to oversee the main unit and the option pack interaction.

4. The method of implementing a personal digital assistant, as set forth in claim 1, wherein the first memory device comprises a flash memory or a read only memory (ROM).

5. The method of implementing a personal digital assistant, as set forth in claim 1, wherein the second memory device comprises an electrically erasable programmable read only memory (EEPROM).

6. The method of implementing a personal digital assistant, as set forth in claim 1, wherein the third memory device comprises no applications and associated drivers prior to the act of downloading the applications and associated drivers from the first memory device to the third memory device.

7. The method of implementing a personal digital assistant, as set forth in claim 1, wherein the third memory device is configured to temporarily store one or more applications and associated drivers.

8. The method of implementing a personal digital assistant, as set forth in claim 7, wherein the third memory device is configured to store the one or more applications and associated drivers temporarily, the one or more applications being received from the first memory device.

9. The method of implementing a personal digital assistant, as set forth in claim 1, wherein the identification data comprises option pack feature information, option pack configuration, and option pack identification.

10. The method of implementing a personal digital assistant, as set forth in claim 1, wherein act (b) comprises the act of transmitting the identification data through a serial interface.

11. The method of implementing a personal digital assistant, as set forth in claim 1, comprising the act of determining whether the power supply in the main unit has enough power to activate the option pack fully.

12. The method of implementing a personal digital assistant, as set forth in claim 1, comprising the act of determining whether the third memory device on the main unit has enough memory capacity to receive the applications and associated drivers stored on the first memory device of the option pack.

13. The method of implementing a personal digital assistant, as set forth in claim 10, wherein act (c) occurs after the device manager has determined that there is enough power in the power supply of the main unit to activate the option pack fully.

14. The method of implementing a personal digital assistant, as set forth in claim 1, wherein act (c) occurs after the device manager has determined that the third memory device on the main unit has enough memory capacity to receive the applications and associated drivers stored on the second memory device.

15. A method of inserting an option pack into a main unit of a personal digital assistant (PDA), comprising the acts of:
   (a) powering-on the main unit;
   (b) determining whether there is an option pack coupled to the main unit;
   (c) providing an interrupt signal from the option pack to the main unit;
   (d) interrupting the processing of the main unit;
   (e) notifying the main unit that the option pack is present;
   (f) transmitting identification information from a first memory device on the option pack to the main unit, before the option pack is fully powered; and (g) downloading one or more software applications and associated drivers from a second memory device on the option pack to the main unit, wherein the first memory device is different from the second memory device.

16. The method, as set forth in claim 15, comprising the act of hot-plugging the option pack into the main unit.

17. The method, as set forth in claim 15, comprising the act of determining whether the main unit has enough power to enable the option pack.

18. The method, as set forth in claim 17, comprising the act of notifying a user as to whether the main unit has enough power to enable the option pack.

19. The method, as set forth in claim 15, comprising the act of determining whether the main unit has enough memory to store the applications and drivers available on the option pack.

20. The method, as set forth in claim 19, comprising the act of notifying a user as to whether the main unit has enough memory to store the applications and drivers available on the option pack.

21. A method of removing an option pack from a main unit of a personal digital assistant (PDA), wherein one or more applications and associated drivers have been downloaded to the main unit for use by the main unit, comprising the acts of:
    (a) de-activating one or more signals configured to detect the presence of the option pack in the main unit;
    (b) disabling control buffers;
    (c) terminating the functionality of the one or more applications running on the main unit; and
    (d) uploading the one or more applications and associated drivers from the main unit to the option pack.

22. A method of implementing a personal digital assistant comprising a main unit and an option pack comprising the acts of:
    (a) coupling the option pack with the main unit, the option pack comprising a first memory device configured to store one or more applications and drivers associated with the one or more applications, and a second memory device configured to store identification data, the main unit comprising a device manager configured to receive the identification data from the second memory device, a power supply, and a third memory device, wherein the first memory device is different from the second memory device;
    (b) transmitting the identification data from the second memory device to the device manager;
    (c) downloading the one or more applications and associated drivers from the first memory device to the third memory device; and
    (d) separating the option pack from the main unit, wherein separating the option pack from the main unit comprises uploading the one or more applications and associated drivers from the third memory device to the first memory device.

23. The method of implementing a personal digital assistant, as set forth in claim 22, wherein the act of separating the option pack from the main unit comprises the act of removing the one or more applications and associated drivers from the third memory device.

* * * * *